United States Patent [19]
Komplin

[11] Patent Number: 6,080,959
[45] Date of Patent: Jun. 27, 2000

[54] SYSTEM AND METHOD FOR FEATURE COMPENSATION OF AN ABLATED INKJET NOZZLE PLATE

[75] Inventor: Steven Robert Komplin, Lexington, Ky.

[73] Assignee: Lexmark International, Inc., Lexington, Ky.

[21] Appl. No.: 09/267,257

[22] Filed: Mar. 12, 1999

[51] Int. Cl.[7] .................................................. B23K 26/38
[52] U.S. Cl. .............................. 219/121.71; 219/121.73; 219/121.83; 430/5
[58] Field of Search ........................ 219/121.7, 121.71, 219/121.73, 121.83, 121.68, 121.69; 430/5

[56] References Cited

U.S. PATENT DOCUMENTS

| | | | |
|---|---|---|---|
| 4,108,659 | 8/1978 | Dini | 96/36.3 |
| 4,490,211 | 12/1984 | Chen et al. | 156/643 |
| 4,624,736 | 11/1986 | Gee et al. | 156/643 |
| 4,666,552 | 5/1987 | Baeuerle | 156/643 |
| 4,680,855 | 7/1987 | Yamazaki et al. | 29/583 |
| 4,684,436 | 8/1987 | Burns et al. | 156/643 |
| 4,716,270 | 12/1987 | Gnanamuthu et al. | 219/121 |
| 4,727,235 | 2/1988 | Stamer et al. | 219/121 |
| 4,780,177 | 10/1988 | Wojnarowski et al. | 156/643 |
| 4,786,358 | 11/1988 | Yamazaki et al. | 156/643 |
| 4,873,413 | 10/1989 | Uesugi et al. | 219/121.68 |
| 4,874,919 | 10/1989 | Bransden et al. | 219/121.68 |
| 4,877,480 | 10/1989 | Das | 156/635 |
| 4,894,115 | 1/1990 | Eichelberger et al. | 156/643 |
| 4,915,981 | 4/1990 | Traskos et al. | 427/53.1 |
| 4,923,772 | 5/1990 | Kirch et al. | 430/5 |
| 4,925,523 | 5/1990 | Braren et al. | 156/643 |
| 4,947,022 | 8/1990 | Ostroff et al. | 219/121.68 |
| 4,952,789 | 8/1990 | Suttie | 219/121.68 |
| 4,964,212 | 10/1990 | Deroux-Dauphin et al. | 29/852 |
| 4,968,868 | 11/1990 | Aketagawa | 219/121.68 |
| 5,160,823 | 11/1992 | Bennin et al. | 219/121.68 |
| 5,169,678 | 12/1992 | Cole et al. | 427/555 |
| 5,221,422 | 6/1993 | Das et al. | 156/643 |
| 5,260,542 | 11/1993 | Ishiguro et al. | 219/121.68 |
| 5,290,992 | 3/1994 | Lin et al. | 219/121.74 |
| 5,305,015 | 4/1994 | Schantz et al. | 346/1.1 |
| 5,378,137 | 1/1995 | Asakawa et al. | 425/174.4 |
| 5,386,430 | 1/1995 | Yamagishi et al. | 372/57 |
| 5,505,320 | 4/1996 | Burns et al. | 216/13 |
| 5,573,875 | 11/1996 | Kaplan et al. | 430/5 |
| 5,609,746 | 3/1997 | Farrar et al. | 205/125 |

FOREIGN PATENT DOCUMENTS

| | | |
|---|---|---|
| 4-187392 | 7/1992 | Japan . |
| 9-236489 | 9/1997 | Japan . |
| 2186973 | 8/1987 | United Kingdom ............. 219/121.83 |

*Primary Examiner*—Geoffrey S. Evans
*Attorney, Agent, or Firm*—D. Brent Lambert; George Stevens

[57] ABSTRACT

A system and method of adjusting mask feature dimensions to compensate for anomalies in energy output of a laser beam used in ablating a workpiece. This method involves measuring the effects of variations in energy output of the laser beam at several points in the laser beam profile. In the case where the workpiece is a nozzle plate, the features adjusted in the mask are the diameters of the mask holes. Differences in the effects of the energy output between the points in the laser beam are then compensated for by adjusting the mask features that correspond to the points in the laser beam.

22 Claims, 7 Drawing Sheets

SYSTEM AND METHOD FOR FEATURE COMPENSATION OF AN ABLATED INKJET NOZZLE PLATE

BACKGROUND OF THE INVENTION

1. Field of the Invention

The present invention relates to a system and method of compensating for variations in energy output of a laser. More particularly, the present invention relates to a system and method for adjusting mask dimensions to compensate for variations in energy output in an excimer laser used in ablating an inkjet nozzle plate.

2. Description of the Related Art

Excimer lasers are widely used in industry to form minuscule structures in objects due to their high-energy output and precision. Frequently, a mask is employed in the laser ablation process so that the laser may ablate very complex structures. Excimer lasers have also found a place in the manufacture of inkjet nozzle plates. When manufacturing a nozzle plate for an inkjet printer it is necessary to form precise nozzle holes, firing chambers and channels. The quality of the ultimate printing is directly effected by the precision of the ablating of the nozzle plate by the excimer laser.

In recent years users of color inkjet printers have seen significant improvements in the resolution of images created by these printers. At present near photographic image quality is possible using four ink color inkjet printers. These high resolution color images are possible in part due to the ability to print 600 or more dots per inch ("dpi"). In order to achieve 600 dpi, the print head must have a nozzle concentration of 600 nozzles openings per inch since a single nozzle is used to create a single drop of ink on the print medium. At this nozzle concentration, the nozzle diameters must be on the order of 16 microns in diameter.

In order to generate nozzle openings of this diameter, various types of lasers have been successfully employed to create the nozzle openings, firing chambers and ink channels as disclosed in the prior art discussed below.

U.S. Pat. No. 5,305,015 to Schantz et al. discloses an inkjet print head made of polymer based flexible tape which is laser ablated to form inkjet orifices, vaporization channels and ink channels. A mask is used in the ablating process to produce the features required in the print head.

U.S. Pat. No. 5,378,137 to Asakawa et al. discloses using a mask having opaque dots situated around the edge of holes in the mask so that when a YAG or excimer laser beam is shown through a hole of the mask, the energy intensity of the laser beam at the edges of the hole is reduced. By allowing the full energy of the laser to strike the workpiece in the center of the hole and only partial energy to travel through the edges, a modified tapered hole may be created in the work piece. Using the disclosures of this patent the angle of taper of holes in structures may be adjusted.

U.S. Pat. No. 4,786,358 to Yamazaki et al. discloses an improved method for forming a pattern on a substrate coated with a film. The substrate is irradiated with a laser beam that is shaped through a mask, and a portion of the film is removed by the energy of the laser beam to produce the desired pattern.

U.S. Pat. No. 4,108,659 to Dini discloses a process for engraving printing surfaces with unmodulated energy beams by interposing a variable reflectivity mask between the energy beam source and the printing surface. The local reflectivity of the mask varies in correspondence with the tone gradation of the original to be printed, and may be formed by conventional photographic techniques, directly on the surface or on a substrate carrier through which the energy beam passes.

However, due to anomalies in the manufacturing of lens and the optical delivery system used in the laser system, the energy output is not consistent throughout the entire width and length of the laser beam. This results in the excimer laser used to ablate the nozzle plates having characteristic energy distribution along the beam profile that creates variations in exit hole diameters and variations in ablated depth from the end to the middle of the beam. With such anomalies, nozzle holes generated will be larger in one part of the nozzle plate and smaller in other parts. Also other features of the nozzle plate and print head would vary such as firing chamber size and channel depth. Thus, the quality of printing would be adversely effected due to the variation in the feature size.

In addition, variations in the nozzle and print head features further effect the performance of the inkjet printer. For example, when nozzle and channel sizes vary the refill time for the firing (vaporizer) chamber will also vary which will force the designer of the inkjet printer to slow the print speed in order to insure that all the firing chambers can be filled before being fired again. Further, variations in the nozzles and print head features will have a direct impact on the drop mass of ink deposited on the print medium and the velocity at which the ink is deposited. In turn, both the drop mass and velocity directly effect the image quality seen by the user.

Therefore, a system and method is needed that can compensate for the anomalies in energy output for a laser system so that uniform structures may be generated throughout a workpiece. This need for consistent structures in nozzle plates and print heads becomes even more critical as structures become smaller in the future in order to achieve still higher resolutions of 1,200 or 2,400 dpi. At these high resolutions, a one to two micron variation in nozzle diameter will cause a 25% or more variation in structure dimensions of the nozzle plate and produce variations in print quality that would be detectable by a user.

SUMMARY OF THE INVENTION

An object of the present invention is to provide a system and method for compensating for the anomalies in energy output for a laser system so that uniform structures may be generated throughout a workpiece.

Objects and advantages of the present invention are achieved in accordance with embodiments by a method of adjusting mask feature dimensions to compensate for variations in energy output of a laser system used in ablating a workpiece. This method compensates for the effects of variations in the energy output between a plurality of points in a coherent light beam by adjusting a plurality of the mask feature dimensions that correspond to the plurality of points in the coherent light beam.

In accordance with embodiments of the present invention the points in the coherent light beam correspond to several nozzle holes in a nozzle plate. Also, the effects of variations in energy output of the laser system are indirectly determined by measuring the diameter of a sampling of the nozzle holes in a nozzle plate. Further, the mask dimensions are mask holes diameters.

Objects and advantages of the present invention are achieved in accordance with embodiments by a method of adjusting mask feature dimensions to compensate for variations in energy output of a laser system seen when ablating a workpiece. This method begins by measuring the effects of variations in energy output of the laser system at several points in a coherent light beam generated by the laser system. Then the method compensates for effects in the variations in the energy output between the points in the coherent light beam by adjusting the mask feature dimensions that correspond to the points in the coherent light beam.

Objects and advantages of the present invention are achieved in accordance with embodiments by a laser system for ablating a workpiece. The laser system uses a laser having measurable inconsistencies in measured energy output within a coherent light beam generated at several measured points of the coherent light beam. A mask is then used having several orifices in which an orifice dimension is adjusted to compensate for the measurable inconsistencies of the light beam at a corresponding point of the measured points.

Objects and advantages of the present invention are achieved in accordance with embodiments by a method of adjusting mask feature dimensions to compensate for variations in energy output of a laser beam generated by a laser system used in ablating a nozzle plate. This method ablates the nozzle plate to create several nozzle holes by transmitting a laser beam through a mask having mask holes of known diameter using the laser system. The energy output of the laser beam is measured at several points by measuring the diameter of a sampling of the nozzle holes. The method then determines that a variance exists between the diameters of the nozzle holes and a desired diameter for the nozzle holes. The method then adjusts the diameter of the mask holes in the mask to compensate for variations in energy output of the laser beam based on the variance.

In accordance with embodiments of the present invention by determining that a variance exists between the diameters of the nozzle holes and a desired diameter by eliminating random variations in the diameters measured for the nozzle holes measured. Also, the variance is determined by fitting a curve to the diameters measured.

In accordance with embodiments of the present invention the fitting a curve to the diameters measured is done using a least squares curve fitting algorithm to determine the best fit for the curve and interpolating between the sampling of diameters for nozzle holes.

In accordance with embodiments of the present invention the method of adjusting mask feature dimensions also creates a mask having mask holes adjusted to compensate for variations in energy output of the laser beam. Further, the method ablates several nozzle plates using the mask and determines whether the nozzle plates are suitable for usage in a printer head.

Objects and advantages of the present invention are achieved in accordance with embodiments by a method of adjusting mask feature dimensions to compensate for variations in the effects of energy output of a laser beam generated by a laser system used in ablating a nozzle plate. This method starts by creating a mask having several mask holes, wherein the several mask holes have a known diameter. It then ablates the nozzle plate to create several nozzle holes by transmitting a laser beam through the mask using the laser system. Further, the method measures the diameter of a sampling of the nozzle holes. This sampling of the nozzle holes is uniformly distributed through out the nozzle plate. The measured diameters of the sampled nozzle holes is graphed. A difference is determined between the sampling of diameters of the sampled nozzle holes. A curve is fitted to the graph showing the sampling of diameters. Then an adjustment is determined in the mask holes to compensate for the difference in the sampling of diameters of the sampled several nozzle holes. Finally, a compensated mask is created based on the adjustment in mask holes.

In accordance with embodiments of the present invention the method of adjusting mask feature dimensions also ablates several nozzle plates to create nozzle holes in each nozzle plate by transmitting a laser beam through the compensated mask using the laser system. It also determines that the nozzle holes each have a diameter that is within a predetermined tolerance and uses the compensated mask to produce nozzle plates for assembly in printer heads.

Objects and advantages of the present invention are achieved in accordance with embodiments by a method of adjusting mask feature dimensions used in ablating a nozzle plate in order to alter the performance characteristics of an inkjet printer. This method starts by adjusting a first mask to alter several mask features of interest in order to improve the operating performance of an inkjet printer. It then ablates several nozzle plates using a laser system with the first mask. The method then proceeds to assemble several printer heads using the nozzle plates. Tests on the printer heads are performed. The optimal mask features are determined that achieve improvement of the operating performance of the inkjet printer. A second mask is adjusted to incorporate only the optimal mask features. Finally, several nozzle plates are ablated using the laser system and the second mask. The nozzle plates are installed in printer heads and used in inkjet printers.

In accordance with embodiments of the present invention the method of adjusting mask feature dimensions also adjusts the second mask for variations in the effects of energy output of the laser.

BRIEF DESCRIPTION OF THE DRAWINGS

These and other objects and advantages of the invention will become apparent and more readily appreciated for the following description of the preferred embodiments, taken in conjunction with the accompanying drawings.

DESCRIPTION OF THE PREFERRED EMBODIMENTS

Figure 1:
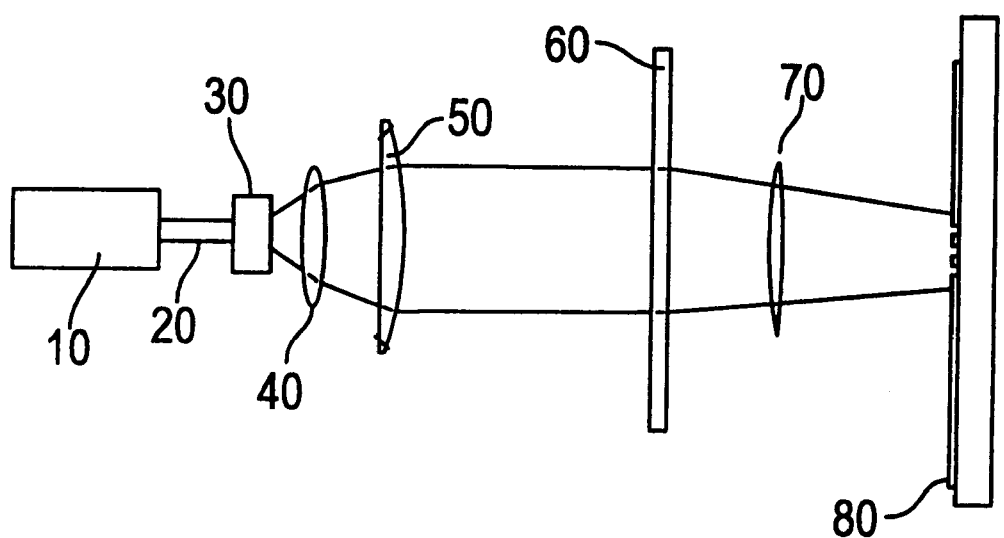
FIG. 1 is a diagram of the hardware configuration of the laser system used to ablate a nozzle plate according to a preferred embodiment of the present invention.

Reference will now be made in detail to the preferred embodiments of the present invention, examples of which are illustrated in the accompanying drawings, wherein like reference numerals refer to like elements throughout.

FIG. 1 is a diagram of the hardware configuration of the laser system including a mask 60 according to an embodiment of the present invention. Excimer laser 10 generates a coherent light beam that travels down a telescope 20. Within telescope 20 are two lenses (not shown) which change the shape and focus of the coherent light beam. This coherent light beam is then expanded into individual light beams and then recombined by a homogenizer 30. The coherent light beam is then further focused by condenser lens 40 and field lens 50 and directed upon and through mask 60. The mask 60 is made of a transparent material such as quartz (not shown) and coated on one side with a light reflecting material such as chrome or a dielectric layer (not shown). At least one row of holes (not shown) is created in the reflective coating of mask 60. As will be discussed later, the holes in the reflective coating are adjusted to compensate for energy variations in the excimer laser 10. The coherent light emitted by laser 10 passes through the holes in the reflective material of the mask 60. This coherent light is then reduced by a factor of five times by a reduction lens 70. As is appreciated by a person of ordinary skill in the art the amount of reduction by the reduction lens 70 may vary dependent on the size of features desired and the quality of the lenses available. The coherent light beam then ablates a nozzle plate 80 and generates structures of the desired size and shape.

Figure 2:
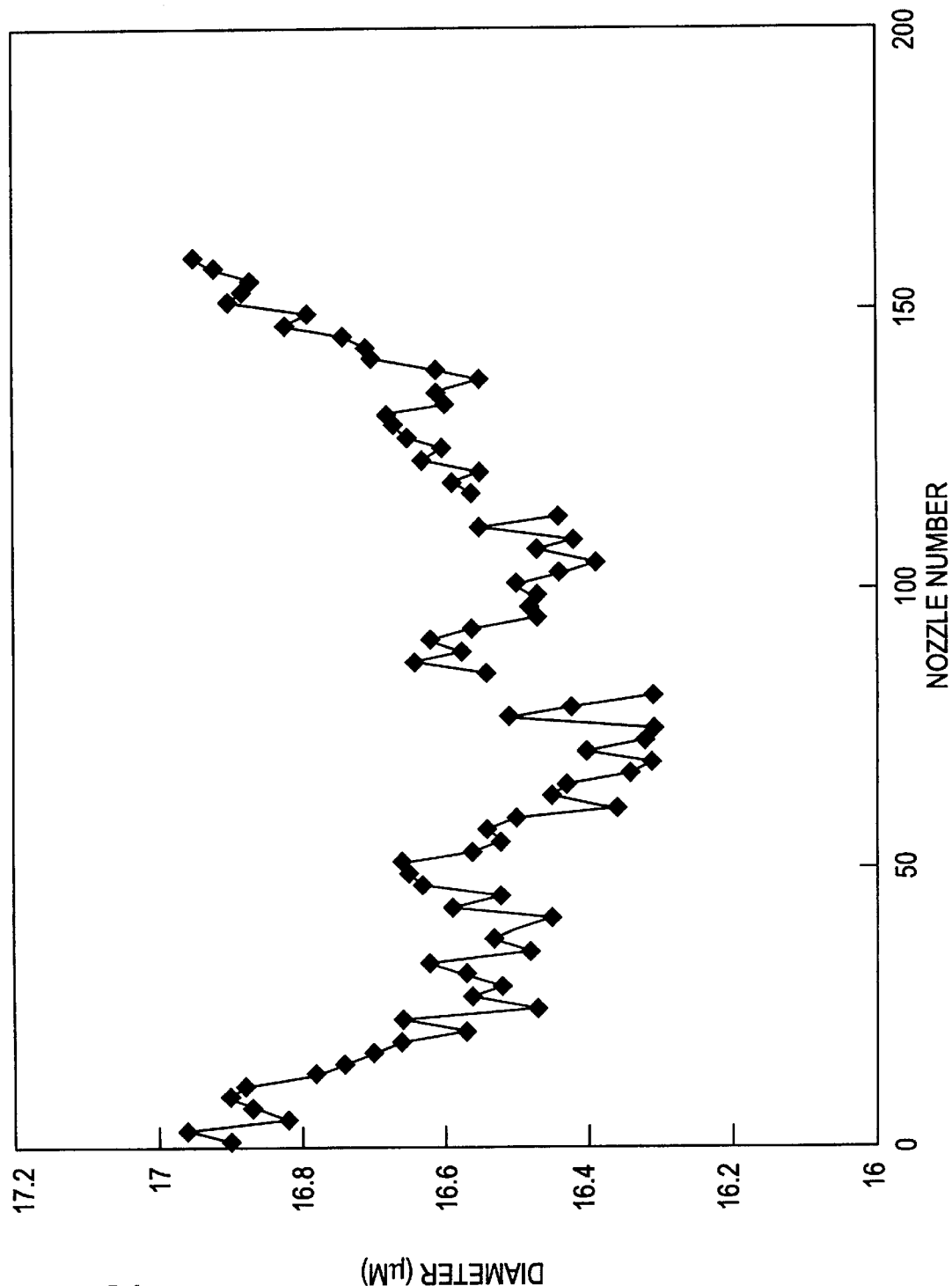
FIG. 2 is a two-dimensional graph showing measured nozzle diameter size versus nozzle number of a single row of nozzles in a nozzle plate created using a mask with a uniform mask hole size according to an embodiment of the present invention.

FIG. 2 is a two-dimensional graph showing measured nozzle diameter size versus nozzle number of a single row of nozzles in a nozzle plate 80 created using a mask 60 with a uniform hole size for sampled nozzles. An example of a mask 60 (also referred to as a standard or uncompensated mask) with uniform holes 300, 310 and 320 is shown for illustrative purposes in FIG. 6A.

Figure 6A:
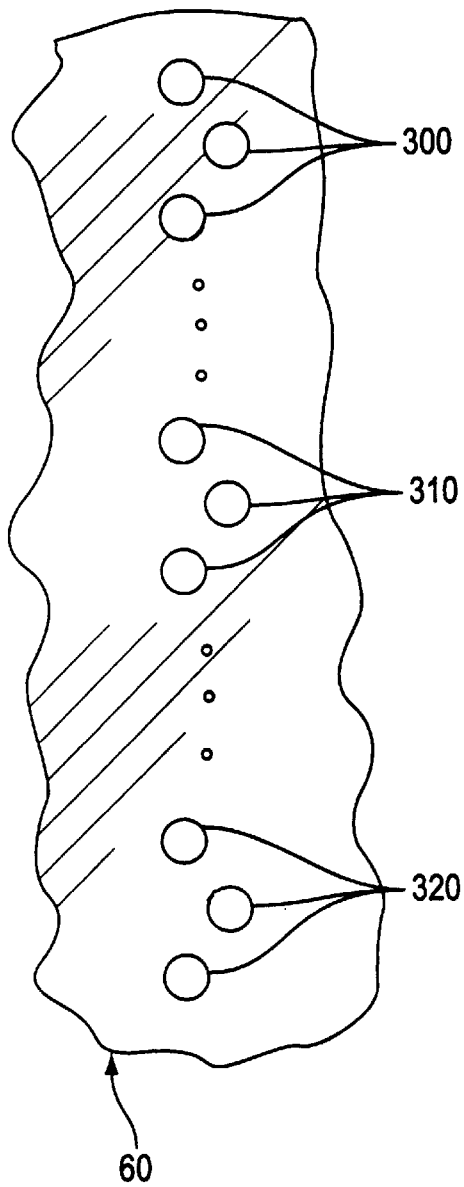
FIG. 6A is a diagram of a mask without any compensation for energy output variations of the laser system shown in FIG. 1 according to an embodiment of the present invention.

It should be noted in FIG. 2 that the diameter of the nozzle holes generated by the uncompensated mask varies from 16.3 microns to 17 microns. An example of the nozzle plate 80 with variable sized nozzle holes 330, 340 and 350 ablated using the uncompensated mask shown in FIG. 6A is provided for illustrative purposes in FIG. 6B. It should be further noted that measuring the diameter of the variable sized nozzle holes 330, 340, and 350 in FIG. 6B, and as graphed in FIG. 2, also serves as an indirect method of measuring the effect of energy variations in the laser system employed to generate the nozzle holes. This is due to the fact that the greater the energy output of the laser system the more material is ablated and therefore the larger the diameter of the holes and the less feature taper is generated. However, as would be appreciated by a person of ordinary skill in the art, any method of directly measuring the energy output or effect of the energy output at various points in the coherent light beam may be employed. One such method of measuring the energy output of the laser system would simply employ a standard commercially available laser power meter, although this can be difficult for very small regions. Therefore, it is much simpler and easier to measure the resulting ablated features and compensate accordingly.

As shown in FIG. 2, nozzle numbers 0–30 and 150–170 are significantly larger than nozzle numbers 50 through 120. This is further illustrated in FIG. 6B in which variable sized nozzle plate holes 330 and 350 are significantly larger than variable sized nozzle plate holes 340. A single coherent light beam that is rectangular in shape with dimensions of approximately 6 mm by 70 mm is employed to ablate the nozzle plate 80. Nozzle numbers 0–30 and 150–170 correspond to opposite ends of the rectangle ablated by the coherent light beam, while nozzle numbers 50–120 correspond to the center portion of the rectangle. As can be seen from FIG. 2, the energy output of the laser system is higher at the ends of the rectangle as compared to the middle, and results in variations in the diameters of variable sized nozzle holes 330, 340 and 350 shown in FIG. 6B.

For the sake of simplicity so far in our discussion, the mask 60 and the nozzle plate 80 have contained only a single row of nozzle holes. However, in the typical inkjet print head nozzle plate at least two, and often more, rows of nozzle holes exist. Where a plurality of rows of nozzle holes are to be ablated simultaneously, consideration must be given to variations in diameter sizes of nozzle holes from one row to another. As would be appreciated by a person of ordinary skill in the art, similar variations can be anticipated along the width of a rectangular coherent light beam as well as the length as discussed above. However, as would be appreciated by one of ordinary skill in the art, the method for correcting these variations in energy output discussed in the embodiments of the present inventions may be employed for any number of rows of nozzle holes. The method employed according to an embodiment of the present invention to compensate for variations in nozzle holes is discussed below.

Preferred Embodiment

Figure 4:
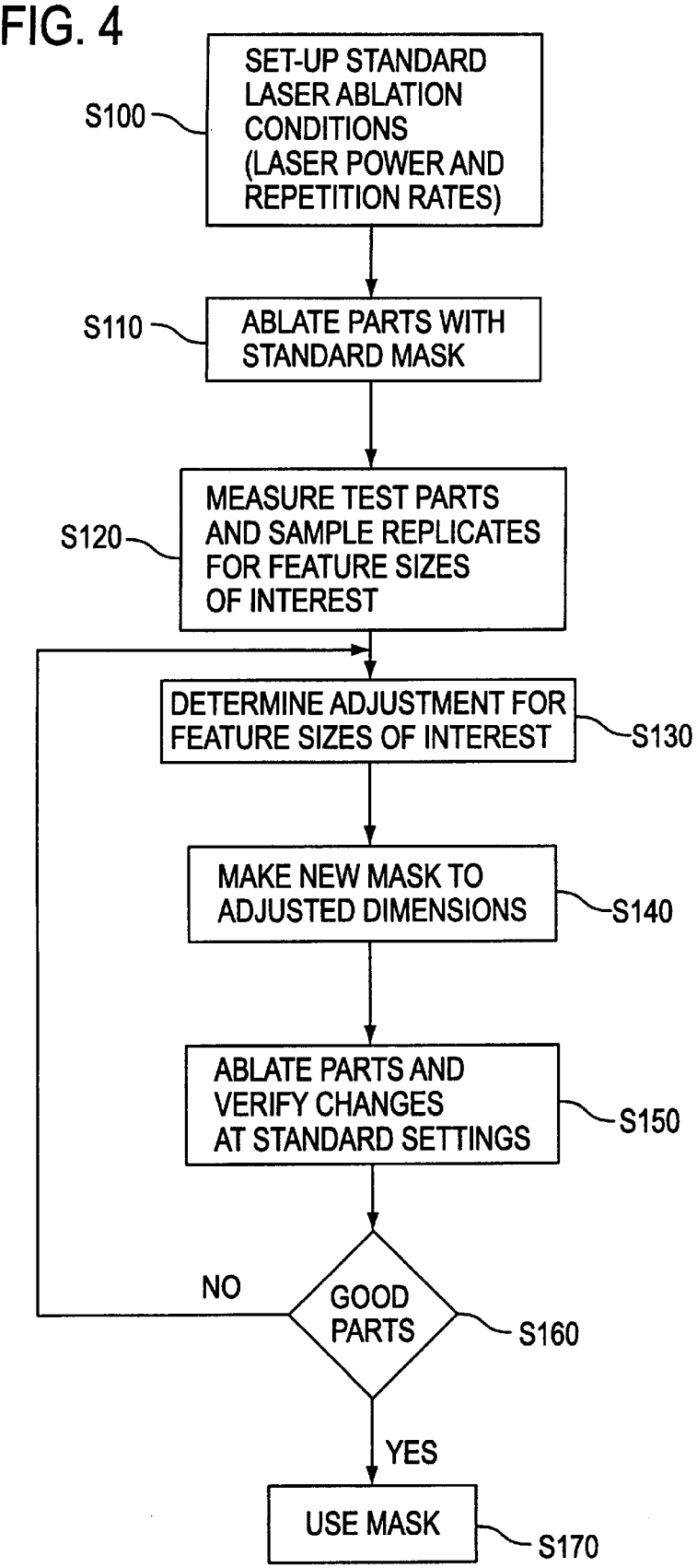
FIG. 4 is a flowchart of the method employed according to an embodiment of the present invention to create a compensated mask that compensates for the variations in the nozzle diameters seen in FIG. 2.
Figure 6B:
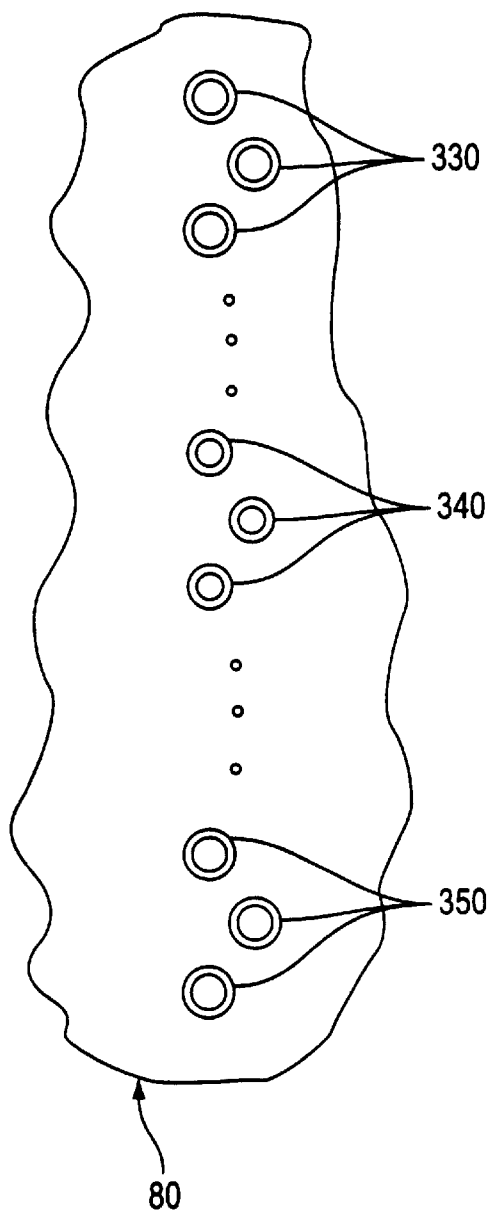
FIG. 6B is a diagram of a nozzle plate created using the mask shown in FIG. 6A which has not been compensated for energy output variations of the laser system shown in FIG. 1 according to an embodiment of the present invention.

FIG. 4 is a flowchart of the method employed according to an embodiment of the present invention to create a mask 60 that compensates for the variations in nozzle diameter seen in FIG. 2 and FIG. 6B.

As provided in step S100 of FIG. 4, the laser system is setup to ablate the nozzle plate 80 under the assumption that no adjustment is necessary to the mask 60 in order to compensate for variations in the power output of the laser system. This setup procedure includes determining the laser 10 power settings and repetition rate necessary to ablate the desired amount of material from the nozzle plate 80.

As provided in step S110 of FIG. 4, the nozzle plate 80 is then ablated using the power settings and repetition rate determined in step S100. The mask 60 used is a standard mask with no compensation in feature sizes for variations in power output. However, a mask 60 in which selected features have been compensated for may also be used. Several nozzle plates 80 or test parts are ablated in a quantity sufficient to provide a statistically significant sample.

In the following description for the sake of simplicity and clarity only uniform nozzle holes and features are mentioned. However, as would be appreciated by one of ordinary skill in the art, any features that may be ablated using a mask may be used and compensated for in accordance with other embodiments of the present invention.

As shown in FIG. 6A, uniform mask holes 300, 310 and 320 are depicted having the same diameter opening in mask 60 as required in step S110 of FIG. 4. Once ablated the resulting nozzle plate 80 is shown in FIG. 6B. It should be noted that variable sized nozzle holes 330 and 350 are significantly larger than variable sized nozzle holes 340. This is consistent with the data shown in FIG. 2 in which the nozzle holes in the center of the ablated area are smaller than those of the edges.

As provided in step S120 of FIG. 4, the features of interest for each nozzle plate 80 or test piece is then measured and recorded. In the case of nozzle plate 80, every single nozzle need not be measured since the typical nozzle plate may contain hundreds of nozzles. As would be appreciated by one of ordinary skill in the art, only a statistical significant number of the features of interest (nozzle hole diameters) need be measured and that these measurements should be evenly distributed throughout the entire area that is being ablated.

As provided in step S130 of FIG. 4, a determination is made regarding the adjustment of the feature sizes of interest based on the measured features recorded in step S120 of FIG. 4. This is accomplished by determining the variance or difference between the measured features dimensions and a desired features dimensions. However, first it is necessary to eliminate random variations (noise) in the data for each nozzle number measured. This may be accomplished by using one or more of several mathematical and statistical algorithms including: averaging; linear modeling; nth order polynomials; quadratic modeling; and nonlinear modeling. A quadratic modeling method would include such techniques as a second order least squares curve fitting. In the preferred embodiment, quadratic modeling is preferred due to superior ability to eliminate outliers and its usefulness in interpolating between measured points. However, the quadratic modeling method has the disadvantage of requiring substantially more test parts ablated and significantly more measurements taken.

Once the random variations (noise) in the measurement data are eliminated and a single set of data for each measured feature is determined, the resulting data may be plotted as shown in FIG. 2. Once plotted, a person of ordinary skill in the art may, at his discretion, determine to treat segments of the data separately and fit a curve to each segment.

In the case of the data shown in FIG. 2, no single equation could easily be determined that fits the measured diameter data for nozzle numbers 0–160. However, by dividing the data into three segments and fitting a curve through each segment, a simpler algebraic equation is possible which accurately represents each segment. For example, in the case of FIG. 2, the first line segment could contain measurements for nozzle numbers 0–40, the second line segment could contain nozzle numbers 41–110, and the third line segment nozzle numbers 111–160.

Once the curves representing segments of the measured nozzle holes is determined, these algebraic equations are used to determine the adjustment to the measured features (nozzle diameters) for the given segment. For example, if the goal is for all nozzle diameters to be 16.5 microns, the algebraic equation for the segment representing nozzle numbers 0–40 would reduce nozzle number 1, and nozzle numbers close thereto, by approximately 0.5 microns. Since, the reduction lens 70 reduces the coherent light beam emitted from mask 60 by a factor of five, the diameter of the mask holes in the vicinity of nozzle number 1 in mask 60 would be reduced by 2.5 microns to achieve the desired result.

Figure 7A:
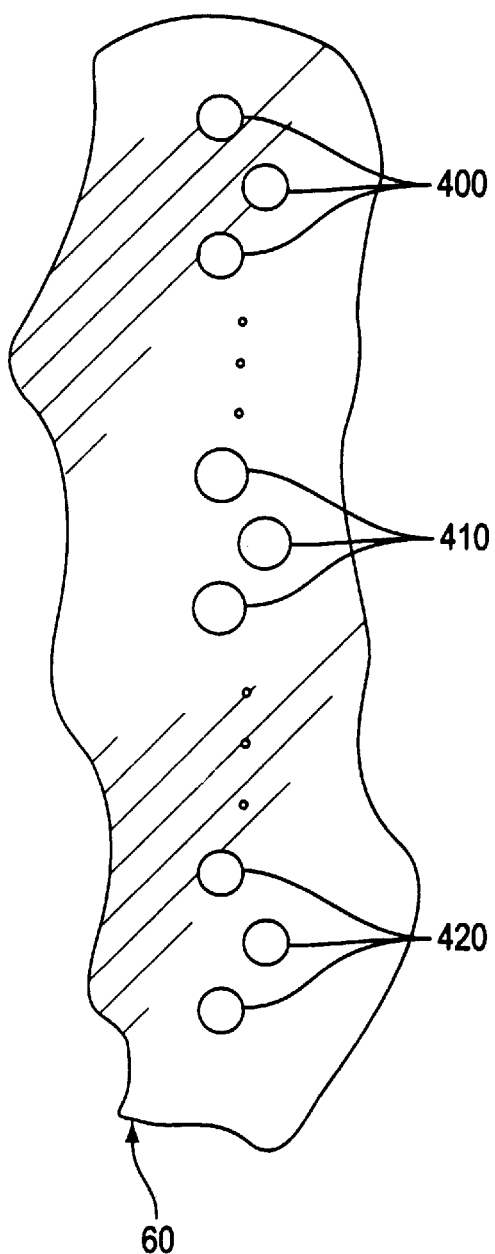
FIG. 7A is a diagram of a mask that has been adjusted for energy output variations of the laser system shown in FIG. 1 using the method shown in FIG. 4 according to an embodiment of the present invention.

As provided in step S140 of FIG. 4, a mask 60 with adjusted nozzle dimensions is created based on the adjusted features determined in step S130. The resulting mask 60 is illustrated in FIG. 7A. It should be noted that variable mask holes 400 and 420 are smaller than variable mask holes 410.

Figure 7B:
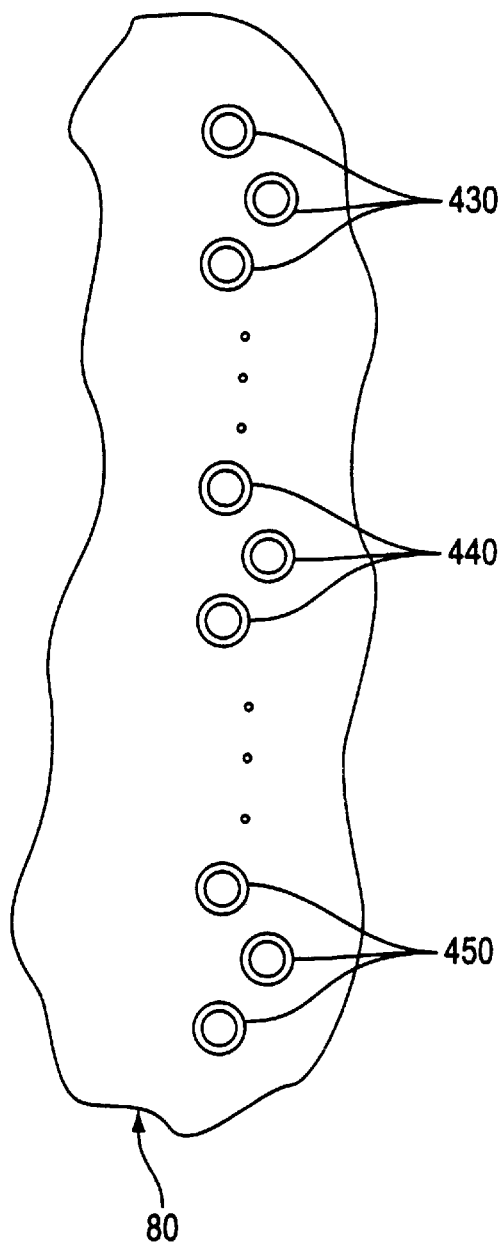
FIG. 7B is a diagram of a nozzle plate created using the mask shown in FIG. 7A which has been adjusted to compensate for energy output variations of the laser system shown in FIG. 1 according to an embodiment of the present invention.

As provided in step S150 of FIG. 4, nozzle plate 80 is ablated using mask 60 having the adjusted variable mask holes 400, 410 and 420 as shown in FIG. 7A. The resulting nozzle plate 80 is depicted in FIG. 7B. It should be noted that the resulting uniform nozzle holes 430, 440 and 450 in FIG. 7B are of approximately of equal diameter. Measurements of a sampling of nozzle holes in nozzle plate 80 is then taken in a similar fashion to that done in step S120 of FIG. 4. A statistical significant sampling of several ablated nozzle plates 80 is conducted and a single average value for each nozzle hole number is determined as was done in step S120 of FIG. 4.

Figure 3:
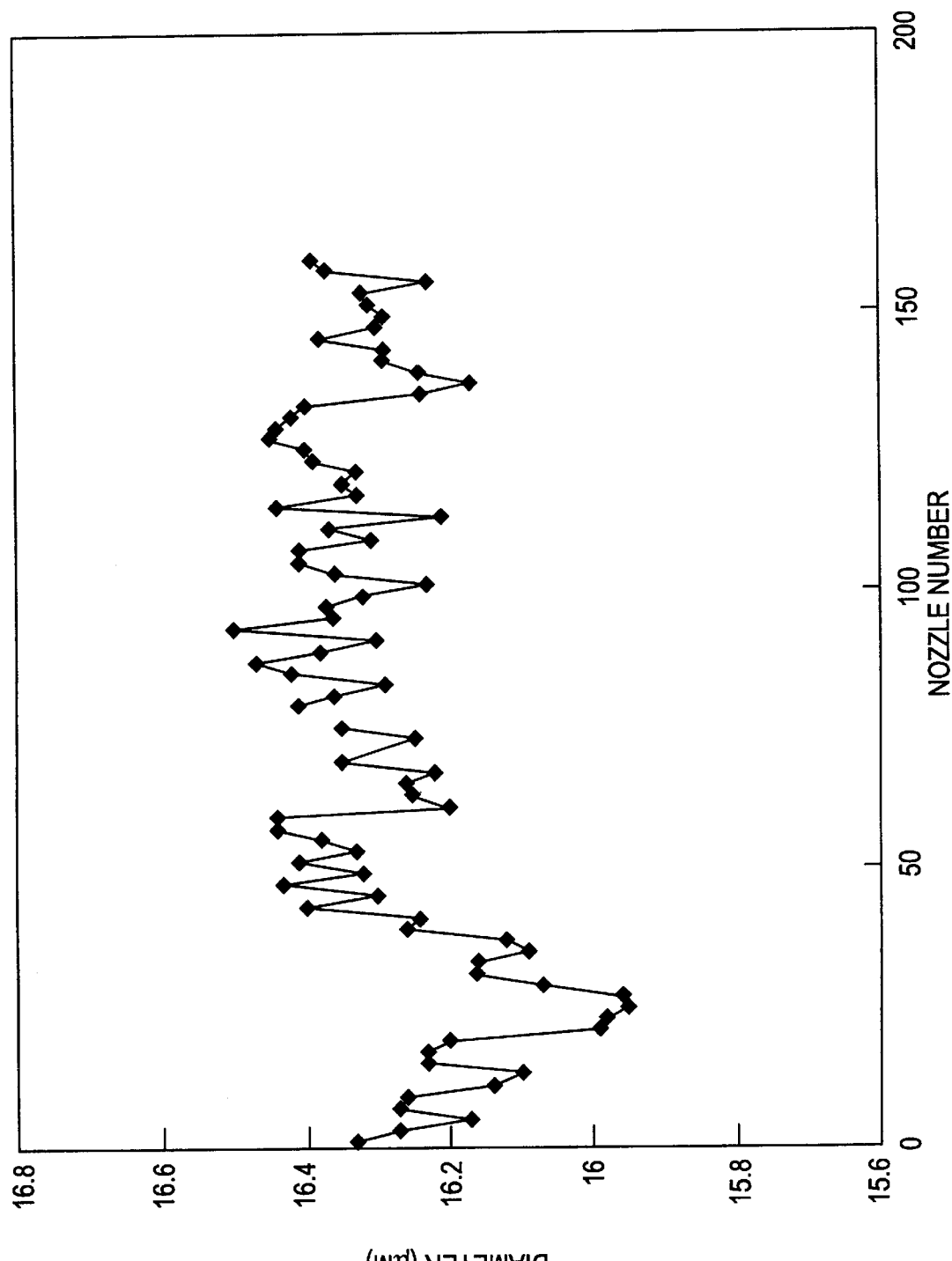
FIG. 3 is a two-dimensional graph showing measured nozzle diameter size versus nozzle number of a single row of nozzles in a nozzle plate created using a mask with compensated hole sizes for all nozzles according to an embodiment of the present invention.

The resulting measurements for the nozzle diameters versus nozzle number are graphed as shown in FIG. 3. It should be noted in FIG. 3, that the difference between nozzle diameters is significantly reduced.

As provided in step S160 of FIG. 4, a determination is made whether the nozzle plate 80 created using mask 60 with variable mask holes 400, 410 and 420 (shown in FIG. 7A) having uniform nozzle holes 430, 440 and 450 (shown in FIG. 7B) are within a predetermined tolerance. If the resulting uniform nozzle holes 430, 440 and 450 do not satisfy the predetermined tolerance then steps S140 through S140 are repeated. Otherwise, the mask 60 is judged as capable of producing good parts and may be used in a production setting as provided in step S170 of FIG. 4.

Alternate Embodiment

Up to this point in the description of the preferred embodiment for the present invention only adjustments to nozzle hole diameters have been discussed. However, the present invention is not limited to only the creation of nozzles with uniform nozzle hole diameters. There are a number of items that can be adjusted in the mask to compensate for variations in the energy output of a laser system. These items include variations in exit hole diameters, linearity spacing and the potential for flow feature compensation due to the variation in ablated depth.

The mask 60 used in the excimer laser system to ablate nozzle structures is five times the size of the desired nozzle plate. Other features such as firing (vaporization) chambers are also five times the size in the mask versus the desired initial size. As the ablation depth increases, the size of the features decreases and a wall angle is formed for the given feature. Wall angle and the size of the feature at the end of ablation depend on materials ablated, pulse energy level, focus position, and number of pulses of the laser system used. Thus, wall angle and ablation depth may be compensated for through adjustments to the mask 60.

The mask 60 may also be adjusted to compensate for variations in positional linearity caused by optical distortion in the laser system. Positional linearity becomes a concern as line lengths of nozzles increases in size which directly effects the final ejected drop position on the print medium.

To compensate for particular variation in rise time caused by flow feature depth and width variation, the mask can be compensated to give an appropriate width for the variation in actual depth.

Put simply, adjustments are made for the inherent variability caused by the energy distribution in the laser profile to achieve the most consistent nozzle structure possible for the constant performance of the print head. Even though the discussion of the variation in power along the long axis of the beam has been the primary focus of the discussion, it is also possible to compensate for variations in the short axis direction, as discussed earlier.

The foregoing features discussed above for nozzle plates and print heads have a direct impact on several critical items. These items include the mass of ink per drop ejected by a nozzle, the speed at which the ink is ejected from the nozzle (drop velocity), the refill rate of the firing chambers, and the ultimate print quality of the printer.

Figure 5:
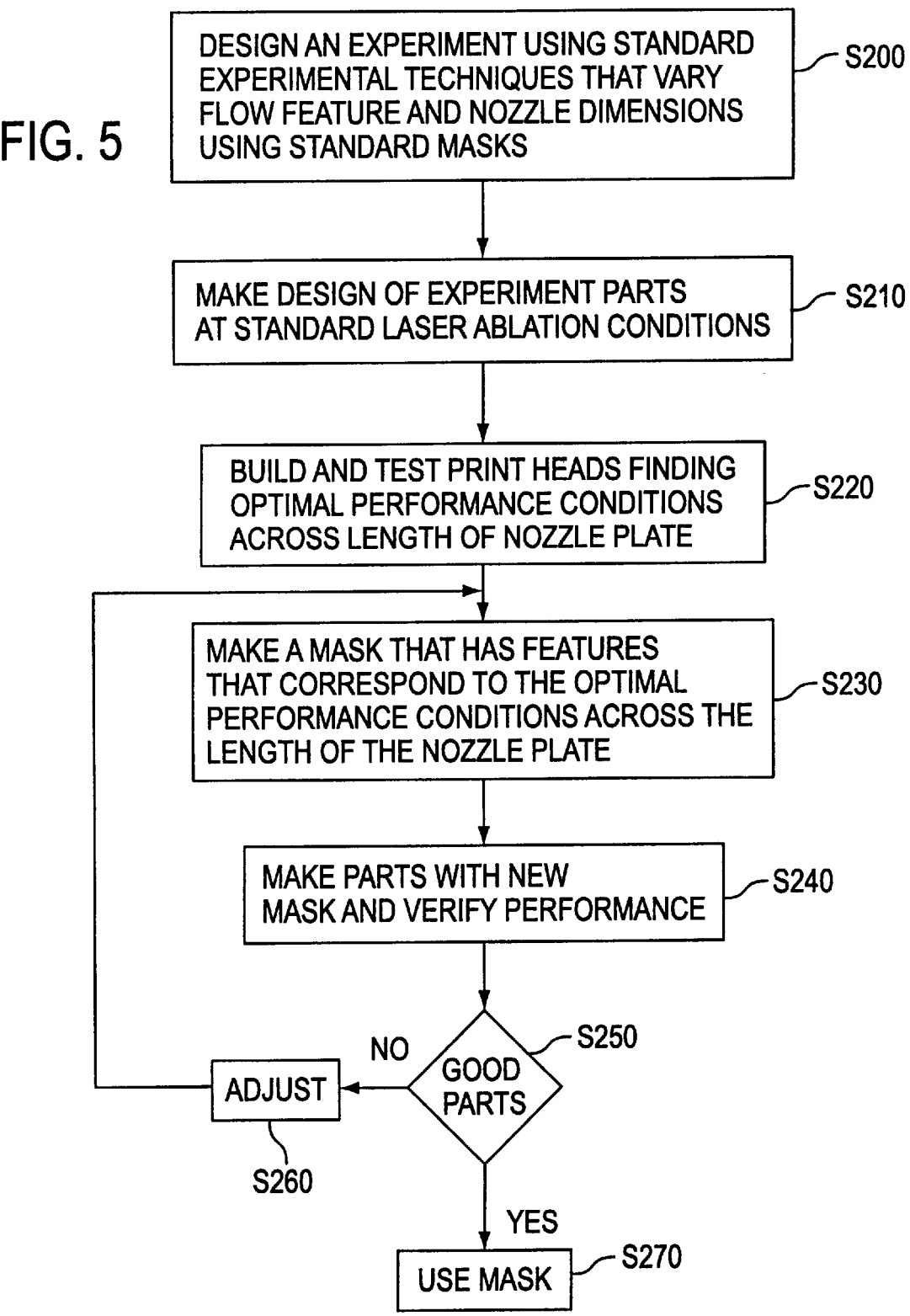
FIG. 5 is a flowchart of the method employed according to an embodiment of the present invention to create a compensated mask that compensates for feature sizes in a nozzle plate and print head.

FIG. 5 is a flowchart of the method employed according to an embodiment of the present invention to create a compensated mask that adjusts feature sizes in a nozzle plate and print head to achieve the desired items discussed above. In the discussion of FIG. 5, steps that are similar to those of FIG. 4 will not be discussed in detail.

As provided in step S200 of FIG. 5, an experiment is designed using mask 60 to ablate test parts in which certain printer characteristics are to be analyzed. An example of one such characteristic is refill rate of firing chambers and how the size and shape of the firing chambers, ink channels and nozzles impacts the refill rate and the printer speed. The mask 60 is then adjusted for any of the foregoing characteristics or combination of characteristics.

As provided in step S210 of FIG. 5, the test parts are ablated using the mask 60 adjusted according to S200 of FIG. 5. A statistically significant number of test parts should be created in this step S210.

As provided in step S220 of FIG. 5, the test parts are assembled into printer heads and tested to determine the impact the adjustments have on the printer performance. A similar statistical analysis of the data occurs here as did in step S130 of FIG. 4. Further, it is determined which feature changes have the greatest desired impact on printing across the entire width and length of the nozzle plate 80.

As provided in step S230 of FIG. 5, once the optimal desired adjustments in the mask 60 are determined, a mask 60 is created that incorporates these adjustments across the entire length of the nozzle plate 80.

As provided in step S240 of FIG. 5, the new parts, such as nozzle plate 80, are created using the mask 60 created in step S230 of FIG. 5. The new parts are then assembled and tested to determine if they perform as anticipated.

As provided in step S250 of FIG. 5, the determination is made whether the new parts created perform as desired. If the new part meet expectations then the mask 60 goes into production use in step S270 of FIG. 5. If the new parts do not meet expectations, then mask 60 is again adjusted in step S260 of FIG. 5 and steps S230 through S240 are repeated.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of adjusting mask feature dimensions to compensate for variations in energy output of a laser system used in ablating a workpiece, comprising:
   compensating for effects of variations in energy output between a plurality of points in a coherent light beam by adjusting a plurality of the mask feature dimensions that correspond to the plurality of points in the coherent light beam.

2. A method of adjusting mask feature dimensions as recited in claim 1, wherein the plurality of points in the coherent light beam correspond to a plurality of nozzle holes in a nozzle plate.

3. A method of adjusting mask feature dimensions as recited in claim 2, wherein the effects of variations in energy output of the laser system are indirectly determined by measuring the diameter of a sampling of the plurality of nozzles holes in the nozzle plate.

4. A method of adjusting mask feature dimensions as recited in claim 3, wherein the plurality of mask dimensions are diameters of a plurality of mask holes.

5. A method of adjusting mask feature dimensions to compensate for variations in energy output of a laser system used in ablating a workpiece, comprising:
   measuring the effects of variations in energy output of the laser system at a plurality of points in a coherent light beam generated by the laser system; and
   compensating for the effects of variations in the energy output between the plurality of points in the coherent light beam by adjusting a plurality of mask feature dimensions that correspond to the plurality of points in the coherent light beam.

6. A method of adjusting mask feature dimensions as recited in claim 5, wherein the plurality of points in the coherent light beam correspond to a plurality of nozzle holes in a nozzle plate.

7. A method of adjusting mask feature dimensions as recited in claim 6, wherein the effects in variations in the energy output of the laser system are measured by measuring the diameter of a sampling of the plurality of nozzles holes in a nozzle plate.

8. A method of adjusting mask feature dimensions as recited in claim 7, wherein the plurality of mask dimensions are diameters of a plurality of mask holes.

9. A laser system for ablating a workpiece, comprising:
   a laser having measurable inconsistencies in measured energy output within a coherent light beam generated at a plurality of points of the coherent light beam; and
   a mask having a plurality of orifices in which an orifice dimension of the plurality of orifices is adjusted to compensate for the measurable inconsistencies of the measured energy output of the coherent light beam at a corresponding point of the plurality of measured points in the coherent light beam laser.

10. A laser system for ablating a workpiece as recited in claim 9, wherein the plurality of points in the coherent light beam correspond to a plurality of nozzle holes in a nozzle plate.

11. A laser system for ablating a workpiece as recited in claim 10, wherein the effects of the variations in the energy output of the laser system is measured by measuring the diameter of a sampling of the plurality of nozzles holes in a nozzle plate.

12. A laser system for ablating a workpiece as recited in claim 11, wherein the plurality of mask dimensions are a plurality of mask hole diameters.

13. A method of adjusting mask feature dimensions to compensate for variations in energy output of a laser beam generated by a laser system used in ablating a nozzle plate, comprising:
   ablating the nozzle plate to create a plurality of nozzle holes by transmitting a laser beam through a mask having a plurality of mask holes of known diameter using the laser system;
   measuring effects of the variations in energy output of the laser beam at a plurality of points by measuring the diameter of a sampling of the plurality of nozzle holes;
   determining that a variance exists between the diameters of the sampling of the plurality of nozzle holes and a desired diameter for the nozzle holes; and adjusting the diameter of the mask holes in the mask to compensate for variations in the effects of the energy output of the laser beam based on the variance.

14. A method of adjusting mask feature dimensions as recited in claim 13, wherein determining that a variance exists between the diameters of the sampling of the plurality of nozzle holes and a desired diameter for the nozzle holes further comprises:

eliminating random variations in the diameters measured in the sampling of diameters for the nozzle holes; and fitting a curve to the diameters measured of the sampling of diameters for the nozzle holes.

15. A method of adjusting mask feature dimensions as recited in claim 14, wherein fitting a curve to the diameters measured of the sampling of diameters for the nozzle holes further comprises:

using a least squares curve fitting algorithm to determine the best fit for the curve and interpolating between the sampling of diameters for nozzle holes.

16. A method of adjusting mask feature dimensions as recited in claim 13, further comprising:

creating a mask having mask holes adjusted to compensate for variations in energy output of the laser beam;

ablating a plurality nozzle plates using the mask; and determining whether the plurality of nozzle plates are suitable for usage in a printer head.

17. A method of adjusting mask feature dimensions to compensate for variations in energy output of a laser beam generated by a laser system used in ablating a nozzle plate, comprising:

creating a mask having a plurality of mask holes, wherein the plurality of mask holes have a known diameter;

ablating the nozzle plate to create a plurality of nozzle holes by transmitting a laser is beam through the mask using the laser system;

measuring the diameter of a sampling of the plurality of nozzle holes, wherein the sampling of the plurality of nozzle holes is uniformly distributed throughout the nozzle plate;

graphing the measured diameters of the sampled plurality of nozzle holes;

determining that a difference exits among the sampling of diameters of the sampled plurality of nozzle holes;

fitting a curve to a graph of the sampling of diameters of the sampled plurality of nozzle holes;

determining an adjustment in the mask holes to compensate for the difference in the sampling of diameters of the sampled plurality of nozzle holes; and creating a compensated mask based on the adjustment in mask holes.

18. A method of adjusting mask feature dimensions are recited in claim 17, further comprising:

ablating a plurality of nozzle plates to create a plurality of nozzle holes in each nozzle plate by transmitting a laser beam through the compensated mask using the laser system;

determining that the plurality of nozzle holes each have a diameter that is within a predetermined tolerance; and using the compensated mask to produce nozzle plates for assembly in printer heads.

19. A method of adjusting mask feature dimensions used in ablating a nozzle plate in order to alter the performance characteristics of an inkjet printer, comprising:

ablating a plurality of nozzle plates using a laser system with a first mask having a plurality of mask features of interest;

assembling a plurality of printer heads using the plurality of nozzle plates;

testing the plurality of printer heads;

determining optimal mask features of the plurality of mask features;

adjusting a second mask to incorporate only the optimal mask features; and ablating a plurality of nozzle plates using the laser system and the second mask.

20. A method of adjusting mask feature dimensions as recited in claim 19, wherein determining optimal mask features of the plurality of mask features is based upon determining which of the plurality of mask features achieves the greatest improvement in operating performance of the inkjet printer.

21. A method of adjusting mask feature dimensions as recited in claim 19, wherein the plurality of nozzle plates ablated using the laser system and the second mask are installed in a plurality of printer heads and used in a plurality of inkjet printers.

22. A method of adjusting mask feature dimensions as recited in claim 19, wherein adjusting a second mask to incorporate only the optimal mask features further comprises:

adjusting the mask for variations in the effects of energy output of the laser.

* * * * *